(12) United States Patent
Carrico, Jr. et al.

(10) Patent No.: US 8,386,099 B2
(45) Date of Patent: Feb. 26, 2013

(54) METHOD AND APPARATUS FOR INITIAL ORBIT DETERMINATION USING HIGH-PRECISION ORBIT PROPAGATION AND MANEUVER MODELING

(75) Inventors: John Paul Carrico, Jr., Hanover, MD (US); Timothy Adam Craychee, Odenton, MD (US); Henry Casmir Grabowski, III, Columbia, MD (US)

(73) Assignee: Applied Defense Solutions, Columbia, MD (US)

( * ) Notice: Subject to any disclaimer, the term of this patent is extended or adjusted under 35 U.S.C. 154(b) by 596 days.

(21) Appl. No.: 12/656,642

(22) Filed: Feb. 5, 2010

(65) Prior Publication Data

US 2011/0196550 A1 Aug. 11, 2011

(51) Int. Cl.
*B64G 1/36* (2006.01)
*G05D 1/00* (2006.01)
*G06F 7/00* (2006.01)

(52) U.S. Cl. .................... 701/13; 701/1; 701/3; 701/18; 701/531; 701/301; 701/302

(58) Field of Classification Search .................. 701/1–8, 701/400–541, 300–302; 244/3.1–3.3, 158.1–173.3, 244/50–52, 75.1–99.9
See application file for complete search history.

(56) References Cited

U.S. PATENT DOCUMENTS

| | | | |
|---|---|---|---|
| 5,804,812 A | 9/1998 | Wicke | |
| 6,011,913 A | 1/2000 | Claffey et al. | |
| 6,085,128 A | 7/2000 | Middour et al. | |
| 6,088,472 A | 7/2000 | O'Donnell et al. | |
| 6,089,507 A | 7/2000 | Parvez et al. | |
| 6,113,034 A | 9/2000 | Basuthakur et al. | |
| 6,133,870 A | 10/2000 | Wehner | |
| 6,133,872 A | 10/2000 | Mitchell et al. | |
| 6,256,602 B1 | 7/2001 | Ellis et al. | |
| 6,305,646 B1 | 10/2001 | McAllister et al. | |
| 6,314,344 B1 | 11/2001 | Sauer et al. | |
| 6,317,662 B1 | 11/2001 | Li et al. | |
| 6,439,507 B1 | 8/2002 | Reckdahl et al. | |
| 6,496,741 B1 | 12/2002 | Whiffen | |
| 6,542,820 B2 | 4/2003 | LaMance et al. | |
| 6,683,563 B2 | 1/2004 | Lee et al. | |
| 6,707,418 B2 | 3/2004 | Hassebrock et al. | |
| 6,708,116 B2 | 3/2004 | Wright | |
| 7,025,307 B2 | 4/2006 | Wang et al. | |

(Continued)

OTHER PUBLICATIONS

Frank G. Lemoine et al., "13 Years of TOPEX/Poseidon Precision Orbit Determination and the 10-fold improvement in expected orbit accuracy", American Institute of Aeronautics and Astronautics Paper 2006-6672, 16 pages.

(Continued)

*Primary Examiner* — Khoi Tran
*Assistant Examiner* — Bhavesh V Amin
(74) *Attorney, Agent, or Firm* — Staas & Halsey LLP

(57) ABSTRACT

A method of determining an orbit of an orbital object includes computing predicted tracking measurement values based on the orbit computed from the initial conditions factoring in any modeled environmental forces and realistic maneuvers; computing the differences between the actual and predicted tracking measurements; determining an improved estimate of the initial conditions that reduces the measurement errors using a minimization or root finding algorithm; after the algorithm has converged, reviewing the hypothetical maneuvers in the force model, taking each value and determining which values came up as near-zero in the minimized solutions and which values came up as those of measurable thrust; determining overall burn duration using the first and last burn times; determining the thrust profile of the orbital object over the observation period using the integrated thrust values; and determining the actual maneuver based on the observation data.

12 Claims, 4 Drawing Sheets

U.S. PATENT DOCUMENTS

| | | |
|---|---|---|
| 7,612,712 B2 | 11/2009 | LaMance et al. |
| 2003/0132878 A1 | 7/2003 | Devereux et al. |
| 2007/0273581 A1 | 11/2007 | Garrison et al. |
| 2007/0299609 A1 | 12/2007 | Garin et al. |
| 2008/0105788 A1 | 5/2008 | Anzel et al. |
| 2009/0204324 A1 | 8/2009 | Trautenberg et al. |
| 2009/0237302 A1 | 9/2009 | Derbez et al. |

OTHER PUBLICATIONS

Seiji Katagiri et al., "Technology of Precise Orbit Determination", Fujitsu Sci. Tech. J., vol. 44, No. 4, pp. 401-409 (Oct. 2008).

Jay Hyoun Kwon et al., "Triple Difference Approach to Low Earth Orbiter Precision Orbit Determination", Korean Space Science Society provided by Kao Korean Astronomical Data Center, J. Astron, Space Sci. 20(1), 1-10 (2003).

METHOD AND APPARATUS FOR INITIAL ORBIT DETERMINATION USING HIGH-PRECISION ORBIT PROPAGATION AND MANEUVER MODELING

BACKGROUND

1. Field

The present invention relates to orbit determination and maneuver detection. More particularly, the present invention relates to determining orbit state under environments which include full environmental perturbations and satellite maneuvering that requires high fidelity maneuver modeling.

2. Description of the Related Art

Orbit determination refers to the estimation of orbits of spacecraft relative to primary celestial bodies, given applicable measurements. Orbit determination methods produce orbit estimates including errors. Orbit determination methods are generally grouped into three categories including Initial Orbit Determination, Batch Least Squares differential corrections, and Sequential Processing.

Of these orbit determination methods, Initial Orbit Determination (IOD) is a common practice in satellite navigation. An IOD method is generally designed to give an approximation of the orbit of an object, which is then refined with other techniques such as Least Squares, Batch Least Squares and Kalman Filtering. Some of the conventional IOD methods developed include Gauss' Method, which uses angle data only; the Herrick-Gibbs method, which uses three position vectors and times; and Lambert's method, which uses two position vectors and time.

Conventional IOD methods assume a simple two-body model for orbit propagation. In a two-body model, only the effects of the central body (typically the Earth) and the object itself are considered, and the central body is assumed to be spherically symmetric so each body can be modeled as a point mass. These assumptions greatly simplify the model of the orbital motion. However, to accurately model an orbit over a period or hours or days, it is necessary to recognize that the central body is not spherically symmetrical. In addition one must consider other forces such as atmospheric drag and solar radiation pressure. Mechanisms for taking into account maneuvers are often necessary. Improper modeling or ignoring these maneuvers altogether makes for poor or unacceptable orbit solutions. Some methods do exist for solving for these with impulsive changes but this is often insufficient to realistically model the maneuver to a sufficient fidelity.

Further, the process of orbit determination as applied to the case of an on-orbit breakup, for instance due to an explosion or collision, raises difficulties related to determining which observations are associated with which piece of debris. Accordingly, a method and apparatus for initial orbit determination that can be used to help sort the observations into groups that are likely to represent observations of the same piece is needed. Once the observations are sorted, standard orbit determination techniques can be used to refine the estimate of the orbit.

SUMMARY

In view of the foregoing, it is an aspect of the present invention to eliminate the assumption that the object experiences simple two-body motion. Specifically, the present invention uses high-precision orbit propagation that includes models of the non-spherical central body, atmospheric drag, solar radiation pressure, and the gravitational attraction of other bodies. Further, high fidelity maneuver modeling and any potential environmental effects on a received signal processed are accounted for orbit determination.

Additional aspects and/or advantages will be set forth in part in the description which follows and, in part, will be apparent from the description, or may be learned by practice of the invention.

The foregoing and/or other aspects are achieved by a method of determining an orbit of an orbital object including: (a) specifying a set of tracking measurement values for the orbit; (b) specifying a force model to represent forces acting on the orbital object; (c) selecting a numerical or analytical integration scheme to compute the object's orbit; (d) specifying known initial conditions including position and velocity for the object; (e) distributing a series of maneuvers over the potential range for which maneuver solutions may occur; (f) applying an orbit propagation scheme to compute the orbit from the initial conditions to the time of the last tracking measurement; (g) computing predicted tracking measurement values based on the orbit computed from the initial conditions; (h) computing a metric based on the differences between the actual and predicted tracking measurements; (i) determining an improved estimate of the initial conditions and/or maneuvers that reduces the metric value of measurement errors using a minimization or root finding algorithm; repeat operations (f) through (i) until the algorithm converges so that the change in the estimated initial conditions is below a predetermined value; (j) after the algorithm has converged, reviewing the hypothetical maneuvers in the force model, taking each value and determining which values came up as near-zero in the minimized solutions and which values came up as those of measurable thrust; (k) determining overall burn duration using the first and last burn times; (l) determining the thrust profile of the orbital object over the observation period using the integrated thrust values; and (m) determining the actual maneuver based on the observation data.

Another aspect provides a method of determining an orbit of an orbital object including: (a) processing one or more batches of observations of the orbital object; (b) validating the observations; (c) process existing orbit determinations; (d) setting an initial state of the orbit based on (c); (e) setting-up a numerical integrator and force model for the environmental perturbations based on (c); (f) for each observation, adding a propagation segment to integrate the orbit to that point in time; (g) for each propagation, returning the computed measurements value based on the orbit propagation that corresponds with that measurement; (h) setting-up a maneuver in the span where any state correction is expected to have occurred and making the values controllable; (i) setting-up minimization or root finding algorithm to control burn parameters to minimize the error metric to within a predetermined tolerance of all of the computed values, the error being calculated as the difference between the actual measurement at that time and the estimated measurement value at that time based on the orbit propagation; and (j) determining convergence once the root finding algorithm completes solution.

Another aspect provides a system of determining an orbit of an orbital object including: (a) processing one or more batches of observations of the orbital object; (b) validating the observations; (c) process existing orbit determinations; (d) examining measurements to determine the potential maneuver time span; (e) for each measurement in the system, adding a maneuver followed by a propagate segment; (f) setting an initial state based on (c); (g) setting-up a numerical integrator and force model for the environmental perturbations based on (c); (h) for each observation, adding a propagation segment to integrate the orbit to that point in time; (i) for each propagation, returning the computed measurements value based on the orbit propagation that corresponds with that measurement; (j) setting-up a maneuver in the span where any state correction is expected to have occurred and making the values controllable; (k) setting-up a minimization or root finding algorithm to control burn parameters to minimize the error metric to within a predetermined tolerance of all of the computed values, the error metric being calculated as the difference between the actual measurement at that time and the estimated measurement value at that time based on the orbit propagation; (l) determining convergence once the root finding algorithm completes solution; and (m) if the solution does not converge repeat operations (a) through (l) with different parameters.

Another aspect provides a method of determining an orbit of an orbital object when an impact event turns the orbital object into one multiple pieces of space debris, the method including: (a) estimating the approximate time of impact on the tracked orbital object; (b) determining the net state change on any piece of debris from the impact as the equivalent of an impulsive maneuver on the piece of debris by; (c) setting-up minimization or root finding algorithm to control the impulsive maneuver and propagate to the measurement time for each piece of debris; (d) setting up a numerical integrator and force model with a nulled-out maneuver for each piece of debris; (e) controlling the maneuver value with the minimization or root finding algorithm to obtain the current observation measurement value; (f) if the solution did converge, archiving the result and post-processing the result with the burn information; (g) if the solution did not converge, flagging the measurement to be re-processed at a later date with modified control values.

The orbital object may be a satellite.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
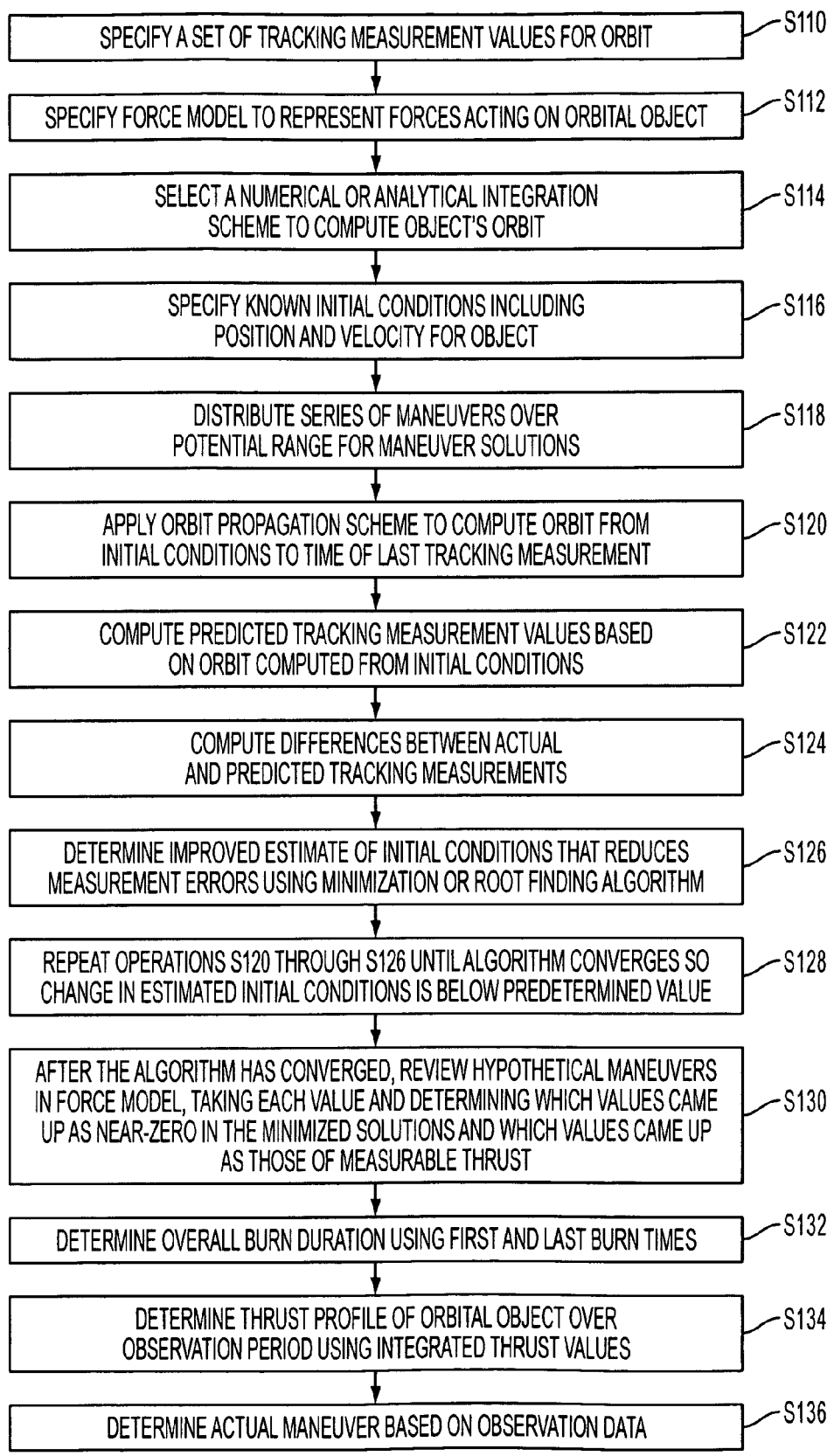
FIG. 1 is a flow chart a method of determining an orbit of an orbital object according to a first embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

The present invention uses high-precision orbit propagation, together with a minimization or root finding technique, to determine an initial orbit estimate that best matches a set of tracking measurements. That is, the invention finds the estimated burn conditions that make as small as possible the differences between the actual tracking measurements and the predicted tracking measurements based on the estimated initial conditions. Because tracking measurements contain measurement errors, and the orbit propagation also contains errors, it is generally not possible to find conditions that exactly match the tracking measurements. However, the present invention minimizes the differences in a statistically relevant way that allows the apparatus to determine accurate state and burn information.

FIG. 1 is a flow chart of a method of determining an orbit of an orbital object according to a first embodiment of the present invention. As shown in FIG. 1, a set of tracking measurement values for the orbit of the orbital object is specified (S110) and a force model to represent forces acting on the orbital object is also specified (S112). A numerical or analytical integration scheme to compute the object's orbit is selected (S114). Next, known initial conditions including position and velocity for the orbital object are specified (S116).

A series of maneuvers over the potential range for which maneuver solutions may occur for the orbital object is then determined (S118) and an orbit propagation scheme is applied to compute the orbit from the initial conditions to the time of the last tracking measurement (S120).

Predicted tracking measurement values based on the orbit computed from the initial conditions are then computed (S122) and the differences between the actual and predicted tracking measurements are also computed (S124).

Accordingly an improved estimate of the initial conditions that reduces the measurement errors using a minimization or root finding algorithm is next determined (S126). Operations S120 through S126 are then repeated until the algorithm converges so that the change in the estimated initial conditions is below a predetermined value (S128).

After the algorithm has converged, the hypothetical maneuvers are reviewed in the force model, taking each value and determining which values came up as near-zero in the minimized solutions and which values came up as those of measurable thrust. (S130).

Overall burn duration using the first and last burn times is then determined (S132) and the thrust profile of the orbital object over the observation period is determined using the integrated thrust values (S134). Finally, the actual maneuver of the orbital object based on the observation data is determined.

In the present invention, the orbital object may be a satellite.

Figure 2:
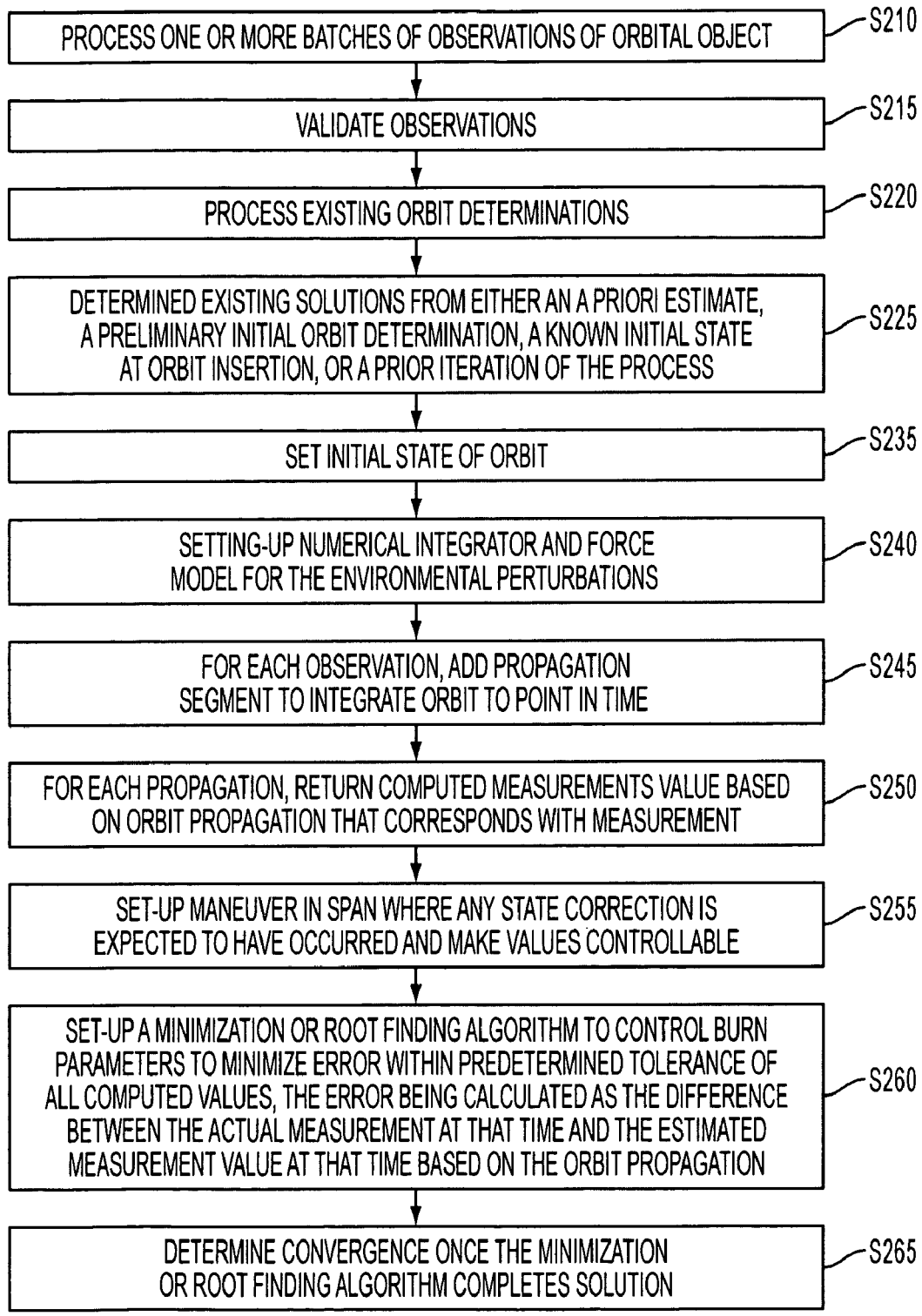
FIG. 2 is a flow chart a method of determining an orbit of an orbital object according to a second embodiment of the present invention.

FIG. 2 is a flow chart a method of determining an orbit of an orbital object according to a first embodiment of the present invention directed to a standard orbit and burn profile, where maneuver durations are such that they occur before the measurements to process. As shown in FIG. 1, one or more batches of observations come into the system for processing (S210) and new measurements are validated to be "reasonable" given the extremes in the variations of the orbit physics among the various measurements (S215). For example, if two measurements a few seconds apart show a variation far in excess allowable by the speed of light then that would be indicative of a problem. Alternatively, existing solutions from either an a priori estimate, a preliminary initial orbit determination, a known initial state at orbit insertion, or a prior iteration of the process are determined (S220). Subsequently, the existing orbit determinations from Operations S210-S220 are processed (S225). Further operations include setting up an initial state of the orbit based on Operation S220 (S235), setting-up a numerical integrator and force model for the environmental perturbations based on Operation S220 (S240), for each observation, adding a propagation segment to integrate the orbit to that point in time (S245), for each propagation, returning the computed measurements value based on the orbit propagation that corresponds with that measurement (S250), setting-up a maneuver in the span where any state correction is expected to have occurred and making the values controllable (S255), setting-up a minimization algorithm to control burn parameters to minimize the error to within a predetermined tolerance of all of the computed values, the error being calculated as the difference between the actual measurement at that time and the estimated measurement value at that time based on the orbit propagation (S260). Next, convergence is determined once the minimization or root finding algorithm completes solution (S265).

If the system converged then a valid solution for the all the burn parameters exists and an accurate estimation of the post-burn conditions have been determined which can be passed on to other flight dynamics or navigation systems.

If the solution did not converge then the system can be re-run with different parameters to try and achieve convergence. This could be things like varying the inputs to the root finding algorithm such as the step size used in testing the control parameters, changing the control parameters based on various appropriate constrained burn settings, et cetera.

Figure 3:
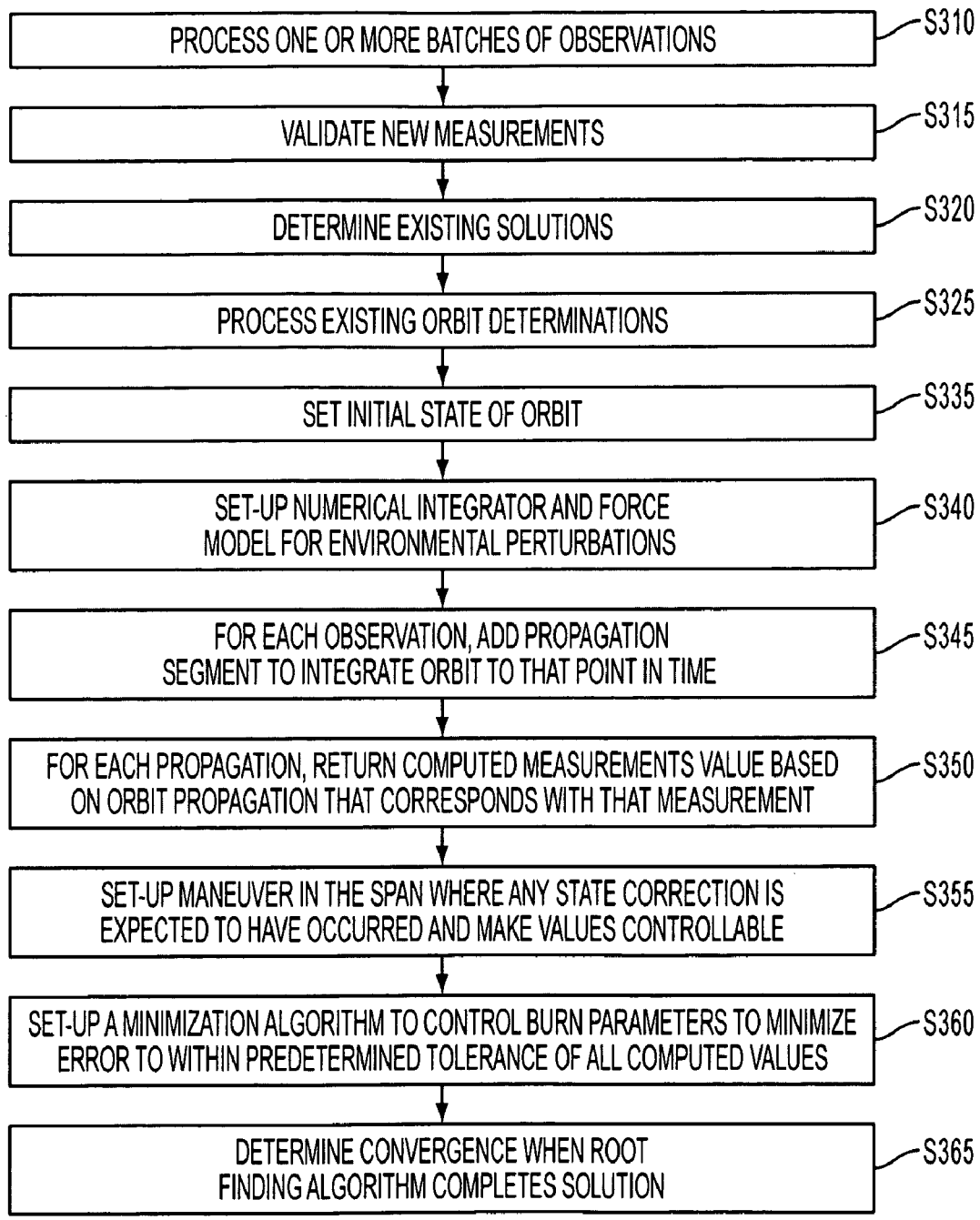
FIG. 3 is a flow chart a method of determining an orbit of an orbital object according to a third embodiment of the present invention.

FIG. 3 present an embodiment of the present invention of a method for determination of an orbit of an orbital object where the maneuvers of the orbital object are long enough to be interspersed with the measurements, such as multi-hour ion engine burns, which more effectively takes into account system dynamics. As shown in FIG. 3, one or more batches of observations come into the system for processing (S310) and new measurements are validated to be "reasonable" given the extremes in the variations of the orbit physics among the various measurements (S315). For example, if two measurements a few seconds apart show a variation far in excess allowable by the speed of light then that would be indicative of a problem. Alternatively, existing solutions from either an a priori estimate, a preliminary initial orbit determination, a known initial state at orbit insertion, or a prior iteration of the process are determined (S320). Subsequently, the existing orbit determinations from Operations S310-S320 are processed (S325). Further operations include setting-up an initial state of the orbit based on Operation S320 (S335), setting-up a numerical integrator and force model for the environmental perturbations based on Operation S320 (S340), for each observation, adding a propagation segment to integrate the orbit to that point in time (S345), for each propagation, returning the computed measurements value based on the orbit propagation that corresponds with that measurement (S350), setting-up a maneuver in the span where any state correction is expected to have occurred and making the values controllable (S355), setting-up a weighted least squares algorithm to control burn parameters to minimize the error to within a predetermined tolerance of all of the computed values, the error being calculated as the difference between the actual measurement at that time and the estimated measurement value at that time based on the orbit propagation (S360). Next, convergence is determined once the root finding algorithm completes solution (S365).

If the solution did not converge then the method can be repeated with different parameters to try and achieve convergence. This could be affected by varying the inputs to the root finding algorithm such as the step size used in testing the control parameters, changing the control parameters based on various appropriate constrained burn settings, et cetera.

If the solution did converge, then the overall span of the maneuver is determined as well as the integrated burn information. This is done by examining each of the maneuvers. A maneuver, versus relatively small errors, inherent in force modeling, will show up as an estimated maneuver of a sufficiently large value, by comparison. By examining the time span of maneuvers where the maneuvers are large the maneuver start and stop times can be estimated.

If the maneuver start time was not found during the entire measurement span there were not any non-environmental perturbations large enough to have been a maneuver. From these results, it can safely be assumed that no maneuver was performed and pass back a "null" maneuver.

If the maneuver start time was found then the maneuver stop time is searched for, to determine if the burn was still on-going at the last measurement. If no burn stop was found then it can assumed that the maneuver is still ongoing. This information, along with the up-to-date burn information can be passed back out of the system.

If a burn stop was found then there is a total burn solution. Each of the burns are integrated to determine the net burn data, including start time, stop time, direction, magnitude, et cetera. Once the maneuver is numerically integrated the system then checks the results to make sure that the integrated results still maintain convergence of the system.

If the integrated maneuver cannot make the measurement errors converge properly then the algorithm is re-run to try searching with modified controls, in the same way the system re-runs when the root finder fails to converge.

Once the system is done processing, either with a successful termination or because the burn is still ongoing, those parameters are synthesized and passed back out for processing by other flight dynamics or navigation systems.

While the previous embodiments were directed to determining state estimation for a given orbital object, i.e., a satellite, there are cases where an impact event turns the one or more spacecraft into space debris. Observers therefore have the problem of seeing multiple pieces of macroscopic material at the same time. Separating the multiple pieces of debris into the individual pieces of debris is extremely difficult. The present invention is able to take the observation measurements and the pre-collision assessment to correlate each individual measurement to each piece of debris in a manner that allows for early orbit determinations for each of the new pieces of space debris.

Given an estimate for the approximate time of impact on the tracked satellite, the net state change on any piece of debris from the impact will be the equivalent of an impulsive maneuver on said piece. The impact is treated as an impulsive maneuver to simulate the state change. A root finder is setup to control the impulsive maneuver and propagate to the measurement time. The expected measurement value is returned at the end of the propagation segment and is used as the constraint on the root finder. For each observation, the numerical integrator and force model is setup with a nulled-out maneuver and the root finder method controls the maneuver value to be able to reach the current observation measurement value. The root finder is run to look for a solution. If the solution did converge then this result will be archived, with the burn information and other values for post processing. If the solution did not converge, the measurement is flagged to be re-processed at a later date with modified control values. If there is more data to process then reset the system, push the new data point restart the process. If there are no more measurements then the data is ready for post processing to determine the number of correlated elements in the debris cloud and the post-impact state of said objects. For each maneuver look to see if they correspond to a prior-maneuver estimate. If they do correlate then these are multiple measurements of the same object. If they do not then this corresponds to a new piece of debris. Aggregate all solutions that correlate for each debris component to distill out the debris cloud data.

Further, the aggregated measurement data is processed for each piece of debris separately to refine the solution for debris with multiple measurements. Next, a list of post-impact debris components is generated with their corresponding state values and the catalog is then exported to other flight dynamics or navigation software.

Figure 4:
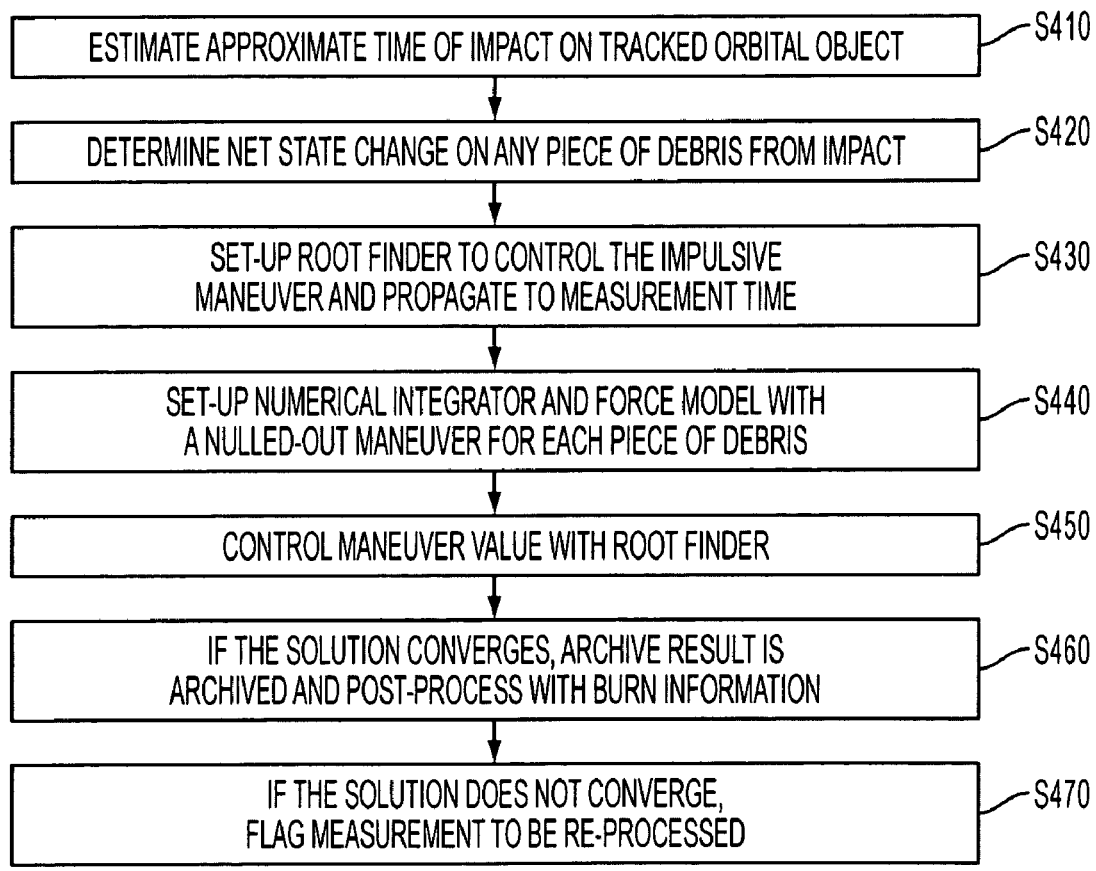
FIG. 4 is a flow chart a method of determining an orbit of an orbital object according to a fourth embodiment of the present invention.

FIG. 4 shows a flow chart of a method of determining an orbit of an orbital object when an impact event turns the orbital object into one multiple pieces of space debris. Referring to FIG. 4, the method of determining an orbit of an orbital object when an impact event turns the orbital object into one multiple pieces of space debris begins with estimating the approximate time of impact on the tracked orbital object (S410). Next, the net state change on any piece of debris from the impact as the equivalent of an impulsive maneuver on the piece of debris is determined (S420). A root finder is set up to control the impulsive maneuver and propagate to the measurement time for each piece of debris (S430). A numerical integrator and force model with a nulled-out maneuver for each piece of debris is then set up (S440). Subsequently, the maneuver value is controlled with the root finder to obtain the current observation measurement value (S450). If the solution converges, the result is archived and post-processed with the burn information (S460). If the solution does not converge, the measurement is flagged to be re-processed at a later date with modified control values (S470).

The inventors have shown examples of the efficiency of the above-described methods in papers titled "Correlating Spacecraft Debris From Various Tracking Measurements" (presented Aug. 11, 2009), and "Orbit Determination Operations for the Interstellar Boundary Explorer" (presented Feb. 15, 2009), which are hereby incorporated by reference.

The above-described embodiments of the present invention can be realized as apparatuses including a computer, where the computer includes a computer readable medium containing processing instructions for implementing the above described methods. The computer readable medium may be a storage media, such as a magnetic storage medium (for example, a ROM, a floppy disc, or a hard disc) or an optical readable medium.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of determining an orbit of an orbital object, comprising:
   (a) specifying a set of tracking measurement values for the orbit using at least one processor;
   (b) specifying a force model to represent forces acting on the orbital object;
   (c) selecting a numerical or analytical integration scheme to compute the object's orbit;
   (d) specifying known initial conditions including position and velocity for the object;
   (e) distributing a series of maneuvers over the potential range for which maneuver solutions may occur;
   (f) applying an orbit propagation scheme to compute the orbit from the initial conditions to the time of the last tracking measurement;
   (g) computing predicted tracking measurement values based on the orbit computed from the initial conditions;
   (h) computing the differences between the actual and predicted tracking measurements;
   (i) determining an improved estimate of the initial conditions that reduces the sum of squares of measurement errors using a minimization or root finding algorithm;
   (j) repeating operations (f) through (i) until the algorithm converges so that the change in the estimated initial conditions is below a predetermined value;
   (k) after the algorithm has converged, reviewing the hypothetical maneuvers in the force model, taking each value and determining which values came up as near-zero in the minimized solutions and which values came up as those of measurable thrust;
   (l) determining overall burn duration using the first and last burn times;
   (m) determining the thrust profile of the orbital object over the observation period using the integrated thrust values; and
   (n) determining the actual maneuver based on the observation data.

2. The method according to claim 1, wherein the orbital object is a satellite.

3. An apparatus to determine an orbit of an orbital object comprising: a computer, wherein the computer includes a non-transitory computer readable medium containing processing instructions comprising:
   (a) specifying a set of tracking measurement values for the orbit;
   (b) specifying a force model to represent forces acting on the orbital object;
   (c) selecting a numerical or analytical integration scheme to compute the object's orbit;
   (d) specifying known initial conditions including position and velocity for the object;
   (e) distributing a series of maneuvers over the potential range for which maneuver solutions may occur;
   (f) applying an orbit propagation scheme to compute the orbit from the initial conditions to the time of the last tracking measurement;
   (g) computing predicted tracking measurement values based on the orbit computed from the initial conditions;
   (h) computing the differences between the actual and predicted tracking measurements;
   (i) determining an improved estimate of the initial conditions that reduces the sum of squares of measurement errors using a minimization or root finding algorithm;
   (j) repeating operations (f) through (i) until the algorithm converges so that the change in the estimated initial conditions is below a predetermined value;
   (k) after the algorithm has converged, reviewing the hypothetical maneuvers in the force model, taking each value and determining which values came up as near-zero in the minimized solutions and which values came up as those of measurable thrust;
   (l) determining overall burn duration using the first and last burn times;
   (m) determining the thrust profile of the orbital object over the observation period using the integrated thrust values; and
   (n) determining the actual maneuver based on the observation data.

4. A method of determining an orbit of an orbital object comprising:
   (a) processing one or more batches of observations of the orbital object using at least one processor;
   (b) validating the observations;
   (c) process existing orbit determinations;

(d) setting-up a minimization or root finding by
   (d1) setting an initial state of the orbit based on (c);
   (d2) setting-up a numerical integrator and force model for the environmental perturbations based on (c);
   (d3) for each observation, adding a propagation segment to integrate the orbit to that point in time;
   (d4) for each propagation, returning the computed measurements value based on the orbit propagation that corresponds with that measurement;
   (d5) setting-up a maneuver in the span where any state correction is expected to have occurred and making the values controllable; and
   (d6) setting-up a the minimization or root finding algorithm to control burn parameters to minimize the error to within a predetermined tolerance of all of the computed values, the error being calculated as the difference between the actual measurement at that time and the estimated measurement value at that time based on the orbit propagation; and
(e) determining convergence once the root finding algorithm completes solution.

5. The method according to claim 4, wherein the orbital object is a satellite.

6. An apparatus to determine an orbit of an orbital object comprising: a computer, wherein the computer includes a non-transitory computer readable medium containing processing instructions comprising:
(a) processing one or more batches of observations of the orbital object;
(b) validating the observations; (c) process existing orbit determinations;
(d) setting-up a minimization or root finding by
   (d1) setting an initial state of the orbit based on (c);
   (d2) setting-up a numerical integrator and force model for the environmental perturbations based on (c);
   (d3) for each observation, adding a propagation segment to integrate the orbit to that point in time;
   (d4) for each propagation, returning the computed measurements value based on the orbit propagation that corresponds with that measurement;
   (d5) setting-up a maneuver in the span where any state correction is expected to have occurred and making the values controllable; and
   (d6) setting-up a minimization or root finding algorithm to control burn parameters to minimize the error to within a predetermined tolerance of all of the computed values, the error being calculated as the difference between the actual measurement at that time and the estimated measurement value at that time based on the orbit propagation; and
(e) determining convergence once the root finding algorithm completes solution.

7. A method of determining an orbit of an orbital object, comprising:
(a) processing one or more batches of observations of the orbital object using at least one processor;
(b) validating the observations;
(c) process existing orbit determinations;
(d) examining measurements to determine the potential maneuver time span;
(e) for each measurement in the system, adding a maneuver followed by a propagate segment;
(f) setting-up a the minimization or root finding by
   (f1) setting an initial state based on (c);
   (f2) setting-up a numerical integrator and force model for the environmental perturbations based on (c);
   (f3) for each observation, adding a propagation segment to integrate the orbit to that point in time;
   (f4) for each propagation, returning the computed measurements value based on the orbit propagation that corresponds with that measurement;
   (f5) setting-up a maneuver in the span where any state correction is expected to have occurred and making the values controllable; and
   (f6) setting-up a the minimization or root finding algorithm to control burn parameters to minimize the error to within a predetermined tolerance of all of the computed values, the error being calculated as the difference between the actual measurement at that time and the estimated measurement value at that time based on the orbit propagation;
(g) determining convergence once the root finding algorithm completes solution; and
(h) if the solution does not converge repeat operations (a) through (g) with different parameters.

8. The method according to claim 7, wherein the orbital object is a satellite.

9. An apparatus to determine an orbit of an orbital object comprising: a computer, wherein the computer includes a non-transitory computer readable medium containing processing instructions comprising:
(a) processing one or more batches of observations of the orbital object;
(b) validating the observations;
(c) process existing orbit determinations;
(d) examining measurements to determine the potential maneuver time span;
(e) for each measurement in the system, adding a maneuver followed by a propagate segment;
(f) setting-up a minimization or root finding by
   (f1) setting an initial state based on (c);
   (f2) setting-up a numerical integrator and force model for the environmental perturbations based on (c);
   (f3) for each observation, adding a propagation segment to integrate the orbit to that point in time;
   (f4) for each propagation, returning the computed measurements value based on the orbit propagation that corresponds with that measurement;
   (f5) setting-up a maneuver in the span where any state correction is expected to have occurred and making the values controllable; and
   (f6) setting-up a minimization or root finding algorithm to control burn parameters to minimize the error to within a predetermined tolerance of all of the computed values, the error being calculated as the difference between the actual measurement at that time and the estimated measurement value at that time based on the orbit propagation;
(g) determining convergence once the root finding algorithm completes solution; and
(h) if the solution does not converge repeat operations (a) through (g) with different parameters.

10. A method of determining an orbit of an orbital object when an impact event turns the orbital object into one multiple pieces of space debris, the method comprising:
(a) estimating the approximate time of impact on the tracked orbital object using at least one processor;
(b) determining the net state change on any piece of debris from the impact as the equivalent of an impulsive maneuver on the piece of debris;
(c) setting-up a root finder to control the impulsive maneuver and propagate to the measurement time for each piece of debris;

(d) setting up a numerical integrator and force model with a nulled-out maneuver for each piece of debris;
(e) controlling the maneuver value with the root finder to obtain the current observation measurement value;
(f) if the solution did converge, archiving the result and post-processing the result with the burn information; and
(g) if the solution did not converge, flagging the measurement to be re-processed at a later date with modified control values.

11. The method according to claim 10, wherein the orbital object is a satellite.

12. An apparatus to determine an orbit of an orbital object comprising: a computer, wherein the computer includes a non-transitory computer readable medium containing processing instructions comprising:

(a) estimating the approximate time of impact on the tracked orbital object;
(b) determining the net state change on any piece of debris from the impact as the equivalent of an impulsive maneuver on the piece of debris;
(c) setting-up a root finder to control the impulsive maneuver and propagate to the measurement time for each piece of debris;
(d) setting up a numerical integrator and force model with a nulled-out maneuver for each piece of debris;
(e) controlling the maneuver value with the root finder to obtain the current observation measurement value;
(f) if the solution did converge, archiving the result and post-processing the result with the burn information; and
(g) if the solution did not converge, flagging the measurement to be re-processed at a later date with modified control values.

* * * * *